United States Patent

Kato et al.

[11] Patent Number: 6,082,482
[45] Date of Patent: *Jul. 4, 2000

[54] VEHICLE STEERING APPARATUS

[75] Inventors: Takayuki Kato; Mitsuhiko Nishimoto, both of Kashihara; Hiroshi Kawaguchi, Mishima, all of Japan

[73] Assignees: Koyo Seiko Co., LTD, Osaka; Toyota Jidosha Kabushiki Kaisha, Aichi, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/026,130

[22] Filed: Feb. 19, 1998

[30] Foreign Application Priority Data

Feb. 19, 1997 [JP] Japan ................................. 9-035204

[51] Int. Cl.⁷ ...................................................... B62D 5/09

[52] U.S. Cl. ............................................. 180/402; 701/41

[58] Field of Search .................................... 180/402, 403, 180/443, 444, 445, 446, 404; 701/41, 42

[56] References Cited

U.S. PATENT DOCUMENTS

| | | | |
|---|---|---|---|
| 5,282,135 | 1/1994 | Sato et al. | 701/43 |
| 5,828,972 | 10/1998 | Asanuma et al. | 701/41 |
| 5,873,430 | 2/1999 | Mueller et al. | 180/402 |
| 5,878,360 | 3/1999 | Nishino et al. | 701/41 |
| 5,896,942 | 4/1999 | Bohner et al. | 180/402 |
| 5,908,457 | 6/1999 | Higashira et al. | 701/41 |

FOREIGN PATENT DOCUMENTS

| | | |
|---|---|---|
| 42 32 256 | 4/1993 | Germany. |
| 2-29017 | 8/1990 | Japan. |
| 4-176781 | 6/1992 | Japan. |

*Primary Examiner*—Kevin Hurley
*Attorney, Agent, or Firm*—Darby & Darby

[57] ABSTRACT

A vehicle steering apparatus comprising a driver's hands free state detector detecting a driver's hands free state when returning of a steering wheel to its neutral position, for controlling a reaction force to be applied to the steering wheel a steering operating angle of the steering wheel or a returning angular speed of the steering wheel, on the basis of the detection signal issued from the driver's hands free state detector. The driver's hands free state detector detects a driver's hands free state on the basis of at least vehicle speed and steering torque.

16 Claims, 10 Drawing Sheets

VEHICLE STEERING APPARATUS

BACKGROUND OF THE INVENTION

The present invention relates to a vehicle steering apparatus; for steering a vehicle by means of a steering mechanism which is not mechanically linked to a steering operating means operated by a driver.

Steering for vehicles is carried out in such a manner that operation of a steering operating means disposed inside a cabin of the vehicle, for example, rotation of a steering wheel, is transferred to a steering mechanism disposed outside the cabin for directing wheels for steering (front wheels in general).

In recent years, wide use has been made of power steering systems. A power steering system or apparatus has an actuator for assisting steering such a as hydraulic cylinder or electric motor disposed midway of the steering mechanism. Such an actuator is driven based on detection of the operational force applied to the steering wheel for steering, and operation of the steering mechanism in response to the rotation of the steering wheel is assisted by the force produced by the actuator, whereby the driver's steering effort is reduced.

However, in such a conventional vehicle steering apparatus, it is necessary to link the steering wheel or steering operating means mechanically to the steering mechanism. This results in the problem that the location of the steering wheel inside the cabin must be restricted to positions at which it can be linked to the steering mechanism disposed outside the cabin. Furthermore, even if the steering wheel is placed at a linkable position to the steering mechanism disposed outside the cabin, a complicated connecting structure is required to realize a satisfactory linking, resulting in increased vehicle weight and complication of of vehicle assembly.

In Japanese Utility Model Application Publication No. 2-29017 (1990) there is disclosed a vehicle steering apparatus which is a power steering apparatus without linkage for the purpose of eliminating the above described problems. This vehicle steering apparatus is constructed such that a steering wheel is disposed separately from a steering mechanism, while an electric motor is disposed midway of the steering mechanism as an actuator for steering, similar to an actuator for assisting steering in a power steering apparatus. In this construction, the electric motor is driven on the basis of the detect on results of an operational direction and an operation amount of the steering wheel, whereby steering is carried out in response to the operation of the steering wheel.

To the steering wheel, which is not linked mechanically to the steering mechanism, is attached a reaction force actuator provided with a motor. The reaction force actuator drives the motor on the basis of detected vehicle speed and a steering operating angle of the steering wheel, whereby a reaction force for directing the steering wheel to its neutral position, which increases; or decreases in response to vehicle speed (high or low) and the magnitude of steering operating angle (large or small) is applied to the steering wheel. In such vehicle steering apparatus, a torque applied by the operator to the steering wheel against the reaction force is detected, a motor current in the electric motor for steering is increased and decreased in response to the results detected, thereby increasing and decreasing the steering force to be produced by the electric motor. Thus, in the above described vehicle steering apparatus, steering can be carried out with the same steering feel as that of a vehicle steering apparatus wherein the steering wheel is mechanically linked to the steering mechanism.

The separate type vehicle steering apparatus constructed as described is useful for developing motor vehicle technology in the future in connection with realization of a novel steering operating means such as a lever, and pedal in place of the existing steering wheel in addition, such an apparatus could facilitate an automatic driving system using travel information, such as detection of a guide mark on the road, reception of satellite information, or the like, in addition to achieving increased flexibility for locating the steering wheel, light weight of the vehicle body, and the like.

In the separate type vehicle steering apparatus, however, when a driver loosens his (or her) hold on the steering wheel when the wheels return to their neutral positions (straight ahead traveling position) during traveling due to self-aligning torque, the torque to be applied to the steering wheel against the above-mentioned reaction force disappears, and as a result, only the reaction force directing to the neutral position is applied to the steering wheel. Hence, the steering wheel returns rapidly in this case, so that driver's steering feel becomes different from that of a conventional steering apparatus.

As a means for rotatively controlling steering wheel in case a driver loosens his (or her) hold on the steering wheel, a vehicle steering apparatus for affording a damping torque to the steering wheel for suppressing vibrations due to the road situation and the control system involved in the vehicle steering apparatus in a driver's hands free state is proposed (Japanese Patent Application Laid-Open No. 4-176781 (1992)). However, this apparatus is a means for suppressing influences derived from the road situation and the control system in case of a driver's hands free state.

BRIEF SUMMARY OF THE INVENTION

The present invention has been devised to solve the above problems. An object of the present invention is to provide a vehicle steering apparatus realizing natural return of a steering operating means to its neutral position following return of wheels to their neutral positions due to a self-aligning torque is realized.

A vehicle steering apparatus according to the present invention comprises a steering angle detecting means for detecting a steering angle of a steering mechanism; a driver's hands free state detecting means for detecting a driver's hands free state when the steering operating means returns to its neutral position; a reaction force stopping means for stopping reaction force control of a steering operating means on the basis of the detection signal from the driver's hands free state detecting means; and a steering operating angle control means for controlling a steering operating angle of the steering operating means on the basis of a steering angle signal of said steering angle detecting means when the stopping means stops reaction force control of the steering operating means.

According to this vehicle steering apparatus, when a driver loosens his (or her) hold on a steering operating means when the wheels return to their neutral positions (straight ahead traveling position) during traveling due to a self-aligning torque and as a result, the steering operating means returns to its midpoint (neutral position), the driver's hands free state detecting means detects this driver's hands free state. The reaction force stopping means stops reaction force control of the steering operating means on the basis of a detection signal from the driver's hands free state detecting means, while the steering operating angle control means controls a steering operating angle of the steering operating means on the basis of a steering angle signal from the steering angle detecting means. Thus, natural returning of the steering wheel to its neutral position which follows return of the wheels to their neutral positions due to self-aligning torque can be realized.

Furthermore, a vehicle steering apparatus according to the present invention comprises a steering angle detecting means for detecting a steering angle of a steering mechanism; a vehicle speed detecting means for detecting moving speed of the vehicle; a driver's hands free state detecting means for detecting a driver's hands free state when a steering operating means returns to its neutral position; a reaction force stopping means for stopping reaction force control of the steering operating means on the basis of a detection signal from the driver's hands free state detecting means; and a steering operating angular speed control means for controlling a return angular speed in steering operating angle of the steering operating means on the basis of a vehicle speed signal of the vehicle speed detecting means and a steering angle signal of the steering angle detecting means when stopping reaction force control of the steering operating means.

According to this vehicle steering apparatus, the above-mentioned natural return of the steering operating means to its neutral position can be realized on the basis of the steering angle of the steering mechanism and vehicle speed.

In the construction of this apparatus, there may further be provided a steering operating angle detecting means for detecting a steering operating angle of the steering operating means, and a steering angle control means for controlling reduction of a steering angle of the steering mechanism on the basis of a steering operating angle signal of the steering operating angle detecting means when a driver's hands free state is detected by the driver's hands free state detecting means.

In this case, the above-mentioned natural return of the steering operating means to its neutral position can be realized on the basis of the steering angle of the steering mechanism, the vehicle speed, and the steering operating angle of the steering operating means.

Moreover, a vehicle steering apparatus according to the present invention comprises a steering angle detecting means for detecting a steering angle of a steering mechanism; a driver's hands free state detecting means for detecting a driver's hands free state when a steering operating means returns to its neutral position; and a correcting means for correcting reduction of a reaction force on the basis of the detection signal of the driver's hand free state detecting means in response to a steering angle signal of the steering angle detecting means.

According to this vehicle steering apparatus, returning of the steering operating means is also controlled by means of control for the reaction force without conducting separately the return control, so that the process is simplified, and as a result more natural returning is realized.

Another object of the present invention is to provide a vehicle steering apparatus by which a driver's hands free state can be accurately detected.

The driver's hands free state detecting means in this vehicle steering apparatus is characterized by including a speed comparing means for comparing the moving speed detected by the vehicle speed detecting means with a predetermined speed; and a torque comparing means for comparing the steering torque detected by the steering torque detecting means with a predetermined value, and the driver's hands free state detecting means detects a driver's hands free state when the moving speed is higher than the predetermined speed and when the steering torque is smaller than the predetermined value.

According to the above, a driver's hands free state can accurately be detected on the basis of vehicle speed and steering torque.

Moreover, the driver's hands free state detecting means is characterized by further including a reaction force comparing means for comparing the reaction force to be afforded to the steering operating means with a predetermined value in addition to both above described both comparing means, wherein the driver's hands free state detecting means detects a driver's hands free state when the moving speed is higher than the predetermined speed, when the steering torque is smaller than the predetermined value, and when the reaction force to be applied to the steering operating means is larger than the predetermined value.

According to the above, a driver's hands free state can accurately be detected on the basis of the vehicle speed, the steering torque, and the reaction force to be afforded to the steering operating means.

Moreover, the driver's hands free state detecting means in the vehicle steering apparatus according to the present invention is characterized by further including a speed comparing means for comparing a moving speed with a predetermined speed; a torque comparing means for comparing a steering torque with a predetermined value; a differentiating means for differentiating the steering torque; and a differential value comparing means for comparing the differentiated value with a predetermined value, wherein the driver's hands free state detecting means detects a driver's hands free state when the moving speed is higher than the predetermined speed, when the steering torque is, smaller than the predetermined value, and when the differentiated value is larger than the predetermined value.

According to the above, a driver's hand free state can accurately be detected on the basis of the vehicle speed, the steering torque, and changes in the steering torque.

The above and further objects and features of the invention will more fully be apparent from the following detailed description with accompanying drawings.

DETAILED DESCRIPTION OF THE INVENTION

The invention will be described in detail hereinafter by referring to the accompanying drawings illustrating the examples thereof.

Embodiment 1.

Figure 1:
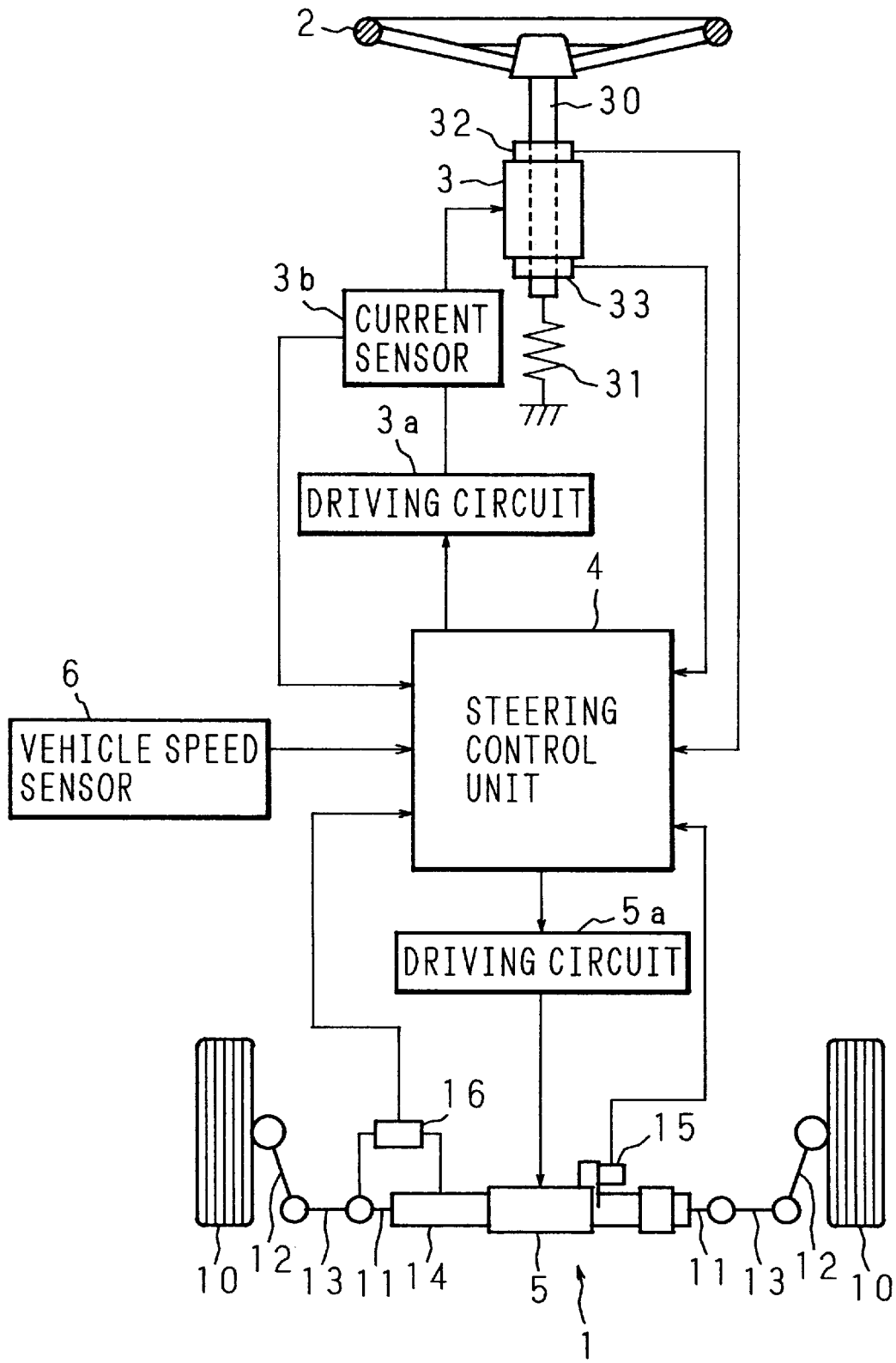
FIG. 1 is a block diagram showing the overall construction of a vehicle steering apparatus according to the present invention.

FIG. 1 is a block diagram showing the overall construction of a vehicle steering apparatus according to the present invention. This vehicle steering apparatus includes a steering mechanism 1 to effect steering operation for a pair of wheels 10, 10 disposed on the opposite sides of the vehicle body; a steering wheel 2 defining a steering operating means and having no mechanical connection with the steering mechanism 1; a reaction force actuator 3 for applying a reaction force to the steering wheel 2; and a steering control unit 4 comprising a microprocessor, which actuates the steering mechanism 1 through a steering motor 5 disposed midway of the steering mechanism 1 and driven by the steering control unit 4 in response to the operation of the steering wheel 2. The steering control unit 4 in this embodiment includes a driver's hands free state detecting means for detecting the driver's hands free state, a reaction force inhibitor for stopping reaction force control of the steering operating means, a steering operating angle control means for controlling the steering operating angle of the steering operating means, a speed comparing means for comparing the moving speed with a predetermined speed, and a torque comparing means for comparing the detected steering torque with a predetermined value.

As is well-known, the steering mechanism 1 is constructed such that the a steering shaft 11 extends laterally within the vehicle body and is mounted for movement along its length. The opposite ends of steering shaft 11 are linked to knuckle arms 12, 12 for supporting wheels 10, 10 by means of separate tie rods 13, 13, and the knuckle arms 12, 12 are pushed and pulled via the tie rods 13, 13 as a result of lateral movement of the steering shaft 11, whereby the wheels 10, 10 are directed to the left or right. Such directing is carried out by converting rotation of the steering motor 5 mounted coaxially midway of the steering shaft 11 into sliding movement of the steering shaft 11 by means of a suitable motion converting mechanism.

Axial rotation of the steering shaft 11 is restricted by a rotation restricting means disposed between a steering shaft housing 14 and the steering shaft 11, whereby rotation of the steering motor 5 is converted into lengthwise sliding of the steering shaft 11, so that steering (directing of the wheels 10, 10 for steering) is effected in response to rotation of the steering motor 5.

The steering angle of the wheels 10, 10 is detected by a steering angle sensor 16 defining a steering angle detecting means through the relative position of the steering shaft housing 14 and the steering shaft 11 on one side of the steering motor 5. Output of the steering angle sensor 16 is provided to the steering control unit 4 together with the output of a rotary encoder 15 for detecting a rotational position of the steering motor 5.

The reaction force actuator 3 for applying the reaction force to the steering wheel 2 is an electric motor (for example, a three-phase brushless motor) wherein the casing thereof is fixedly mounted on a suitable portion of the vehicle body in relation to a rotation shaft 30. The steering wheel 2 is coaxially secured to a protruding end of the rotation shaft 30, while a protruding opposite end is linked to a suitable portion of the vehicle body through a torsion spring 31 having predetermined elasticity.

The reaction force actuator 3 is driven in a direction opposite the movement of steering wheel 2 by a current from a driving circuit 3a in response to a reaction force instruction torque signal from the steering control unit 4. Accordingly, the driver must apply additional steering torque against the reaction force generated by the reaction force actuator 3 for rotating the steering wheel 2. The steering torque applied to the steering wheel 2 is detected by a torque sensor 32 attached to the reaction force actuator 3. Furthermore, the amount of steering wheel operation (a steering operating angle) and the operating direction of the steering wheel 2 are detected by a rotary encoder 33 attached to the reaction force actuator 3. These detection results are provided to the steering control unit 4.

Moreover, the current applied to the reaction force actuator 3 from the driving circuit 3a is detected by a current sensor 3b and provided to the steering control unit 4.

Owing to its elasticity, the torsion spring 31 disposed between the other (lower) end of the rotation shaft 30 and a part of the vehicle body functions to rotate the rotation shaft 30 when the driver releases the steering wheel 2, whereby the steering wheel 2 is returned to a predetermined neutral position. The returning motion is necessary to return the steering wheel 2 to achieve a straight ahead driving direction of the wheels 10, 10 through the steering mechanism 1, which is mechanically separated from the steering wheel 2.

As described above, the steering control unit 4 is the actual state of steering in the steering mechanism 1 by way of the inputs from the rotary encoder 15 and the steering angle sensor 16, as well as the state of operation for the steering wheel 2 by way of the inputs from the torque sensor 32 and the rotary encoder 33, respectively. In addition to these inputs, an output of the vehicle speed sensor 6 is provided as an input to the steering control unit 4.

On the other hand, outputs of the steering control unit 4 are provided to the reaction force actuator 3 and the steering motor 5 through the respective separate driving circuits 3a, 5a, whereby the reaction force actuator 3 and the steering motor 5 act separately in response to instruction signals from the steering control unit 4.

The steering control unit 4 determines the reaction force to be applied to the steering wheel 2 in relatonship, for example, to vehicle speed as determined by sensor 6, whereby the reaction force control is conducted by issuing a reaction force instruction torque signal to the reaction force actuator for generating the reaction force.

Furthermore, the steering control unit 4 recognizes the operation angle and operating direction of the steering wheel 2 by means of the input from the rotary encoder 33, to calculate a steering angle deviation between the operation angle and an actual steering angle determined from the input from the steering angle sensor 16 provided on the steering mechanism 1. Then, it corrects the steering angle deviation in reverse relationship to vehicle speed determined from the input from vehicle sensor 6, to determine a target steering angle. Steering control action for driving the steering motor 5 is carried out until the target steering angle is obtained. In this case, the input from the rotary encoder 15 is utilized as a feedback signal for examining whether the steering motor 5 reaches a desired rotational position or not.

Operation of a vehicle steering apparatus having the construction described above will be explained hereinafter with reference to flowcharts illustrating such operation.

Figure 2:
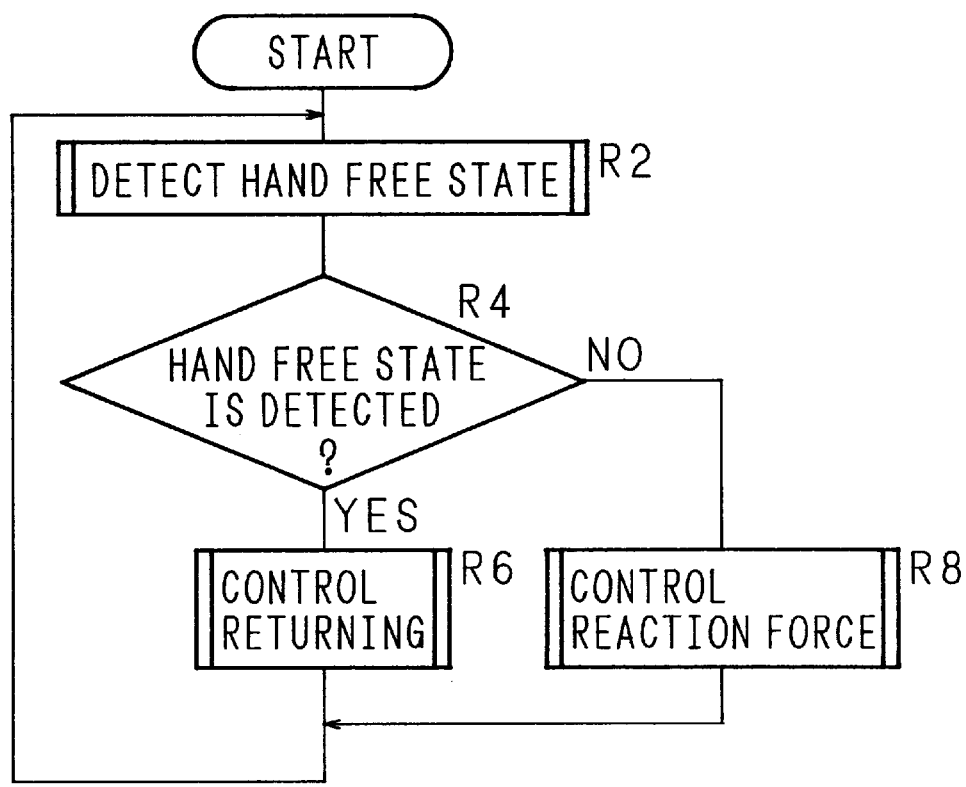
FIG. 2 is a flowchart illustrating a procedure of operation in the vehicle steering apparatus according to the present invention.

FIG. 2 is a flowchart illustrating a processing procedure for operation of the vehicle steering apparatus according to Embodiment 1. The steering control unit 4 periodically performs a routine that detects a hands free state when a driver releases the steering wheel 2 and the vehicle wheels return to their neutral positions (straight ahead traveling position) due to self-aligning torque during travel of the vehicle. As a result, the steering wheel 2 returns to its neutral position (R2). When such driver's hands free state is not detected (R4), the above-mentioned routine for the reaction force control is executed (R8). When the driver's hands free state is detected (R4), the reaction force control is not executed, but a routine for returning control of the steering wheel 2 is executed (R6).

Figure 3:
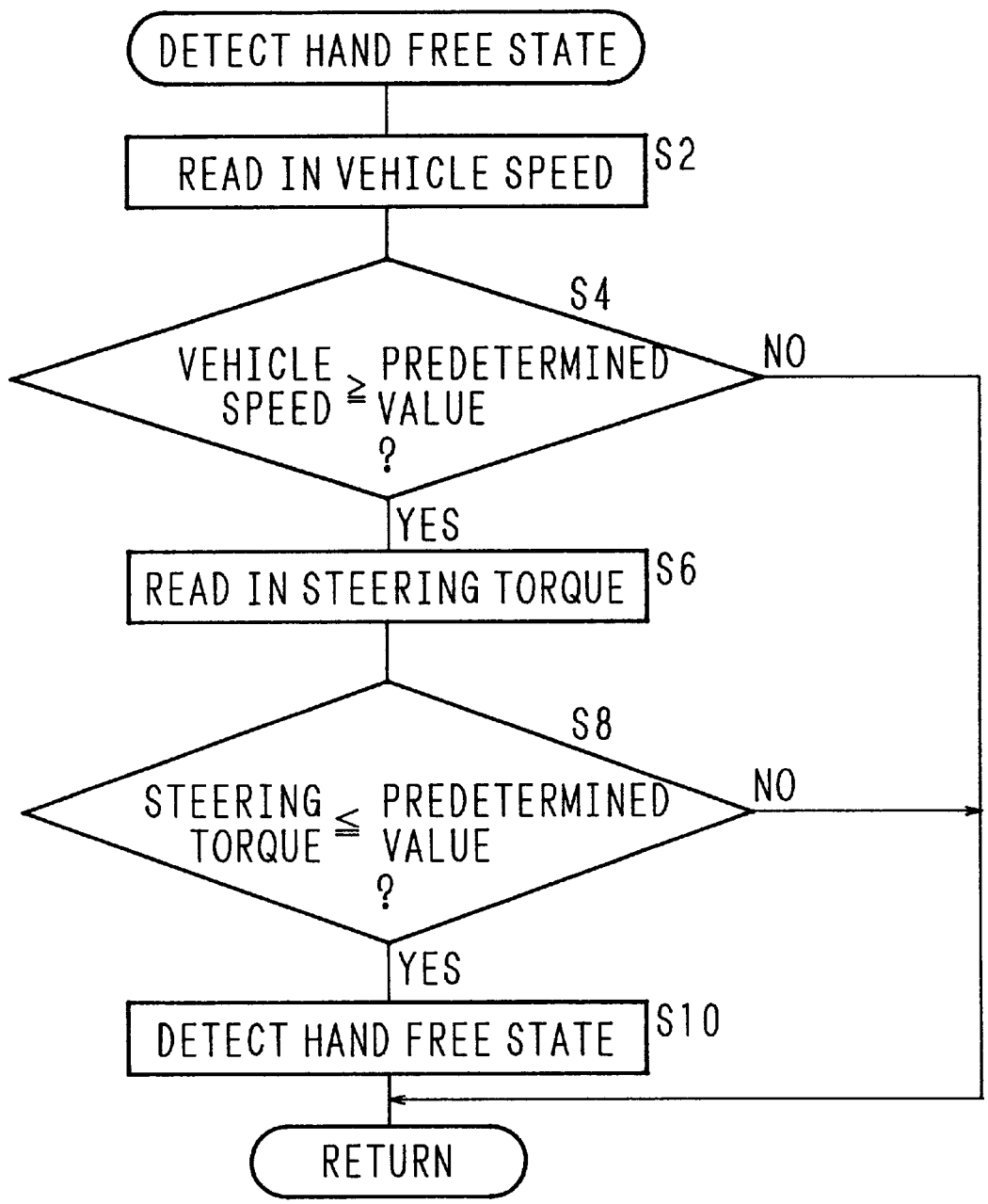
FIG. 3 is a flowchart illustrating a processing of the routine for detecting a driver's free hands state in the vehicle steering apparatus according to Embodiment 1.

FIG. 3 is a flowchart illustrating in detail a processing procedure of the routine (R2) for detecting the driver's hands free state of Embodiment 1. The steering control unit 4 reads in the vehicle speed from the vehicle speed sensor 6 (S2), when the vehicle speed is a predetermined value or more (S4), the steering control unit 4 reads the steering torque of the steering wheel 2 from the torque sensor 32 (S6). When the obtained steering torque (S6) is a predetermined value or less (S8), it is determined that there is a driver's hands free state for detecting (S10), and the procedure returns. In case either the read vehicle speed (S2) is less than the predetermined value (S4), or the read steering torque (S6) exceeds the predetermined value (S8), it is not determined that there is a driver's hands free state, and the procedure returns.

In the routine for detecting a driver's hand free state (R2), while it is determined that there is a driver's hand free state when the vehicle speed is the predetermined value or more (S4), and when the steering torque is the predetermined value or less (S8), there may be added a condition such as reaction force instruction torque being a predetermined value or more (a deviation between reaction force instruction torque and steering torque is excessive) or such as a change in steering torque is a predetermined value or more (rapid decrease in steering torque), in addition to the above described two conditions (S4, S8).

Figure 4:
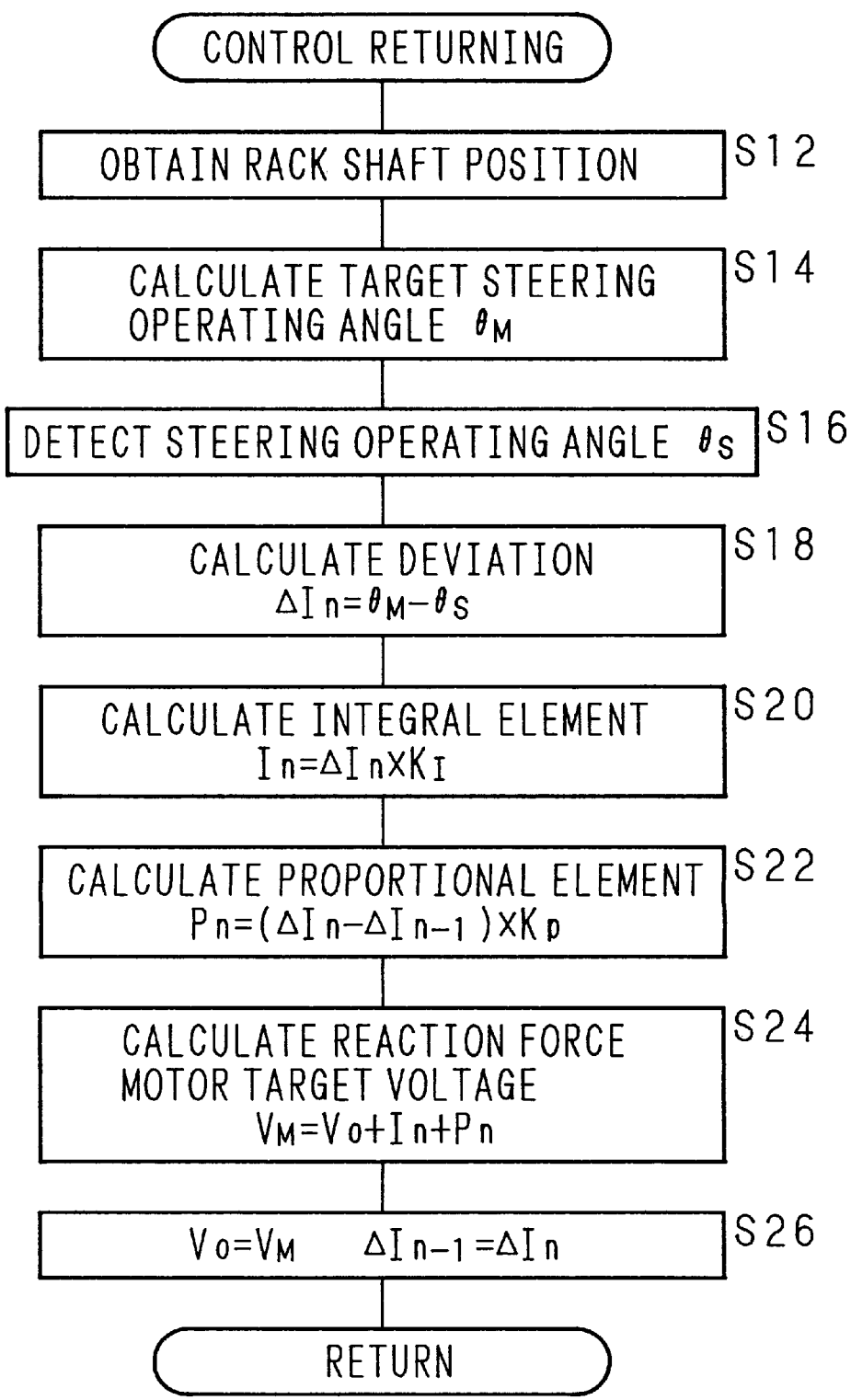
FIG. 4 is a flowchart illustrating a processing routine for return control in the vehicle steering apparatus according to Embodiment 1.

FIG. 4 is a flowchart illustrating in detail the return controlling routine (R6) of Embodiment 1. When the steering control unit 4 detects the driver's hand free state (R4 in FIG. 2), it obtains the steering angle (a position of rack shaft) of the wheels 10, 10 (S 12) from the steering angle sensor 16, and calculates a steering wheel target steering operating angle $\theta_M$ in response to the steering. angle (S14). Then, the steering operating angle $\theta_S$ of the steering wheel 2 is detected by the rotary encoder 33 (S16), and the steering angle deviation $\Delta I_n = \theta_M - \theta_S$ defined between the steering wheel target steering operating angle $\theta_M$ and the steering wheel steering operating angle $\theta_S$ is calculated (S18).

Thereafter, an integral element $I_n = \Delta I_n K_1$ ($K_1$: predetermined integral constant) of the returning control is calculated (S20), and further, a proportional element $P_n = (\Delta I_n - \Delta I_{n-1}) K_P$ ($I_{n-1}$: steering angle deviation in the preceding cycle, $K_P$: predetermined proportional constant) is calculated (S22). Then, a target voltage of an electric motor in the reaction force actuator 3 (reaction force motor target voltage) $V_M = V_0 + I_n + P_n$ ($V_0$: a target voltage in the preceding cycle) is calculated (S24) to output the target voltage $V_M$ from the driving circuit 3a, whereby the electric motor of the reaction force actuator 3 is driven. Thereafter, the target voltage $V_M$ and the steering angle deviation $I_n$ are defined as the target voltage $V_0$ in the preceding cycle and to the steering angle deviation in the preceding cycle $I_{n-1}$, respectively (S26), and the procedure returns.

Figure 5:
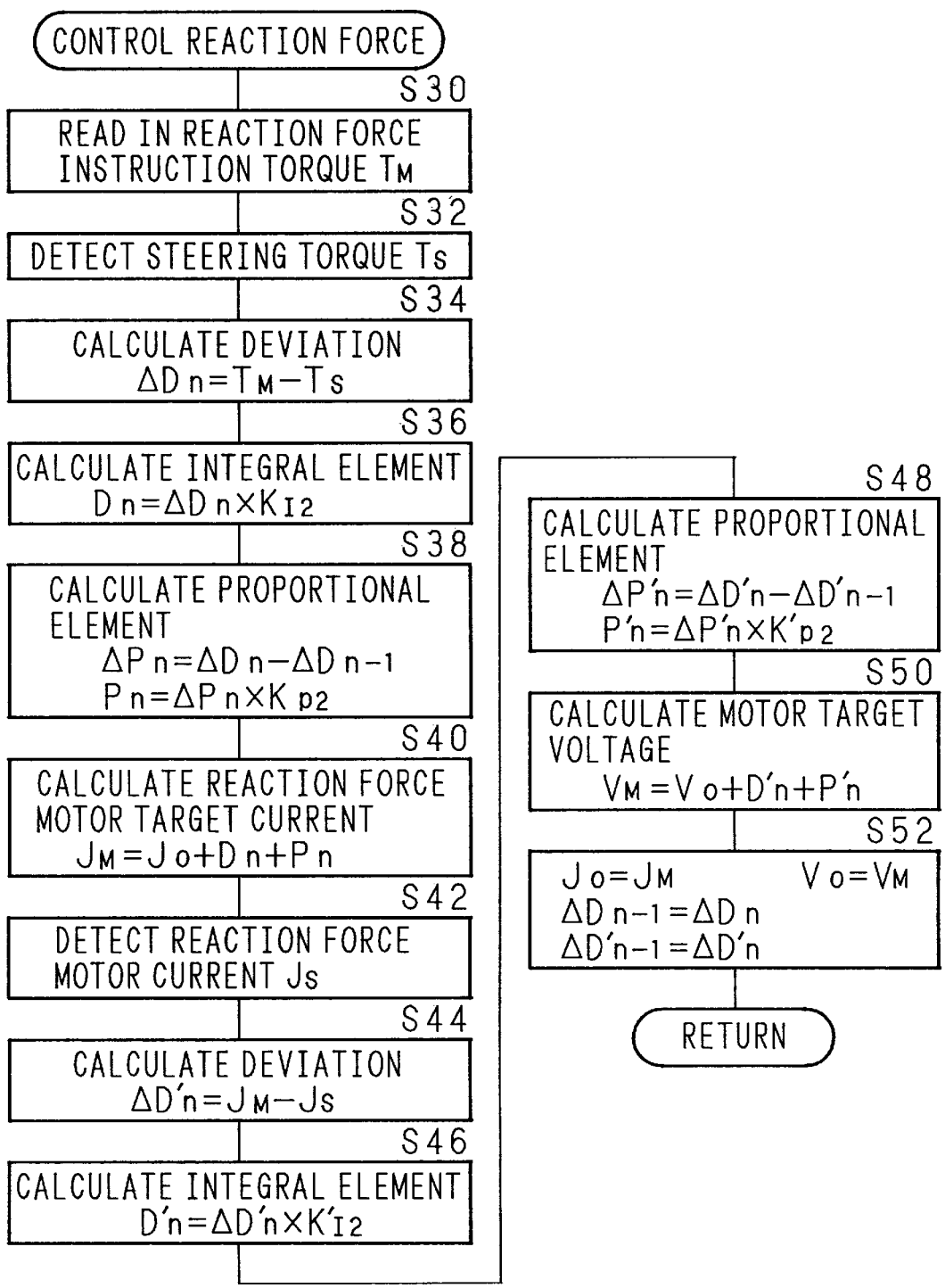
FIG. 5 is a flowchart illustrating a processing routine for reaction force control of the vehicle steering apparatus according to Embodiment 1.

FIG. 5 is a flowchart illustrating in detail the processing procedures for the reaction force control routine (R8) of Embodiment 1. When a driver's hands free state is not detected by the steering control unit 4 (R4 in FIG. 2), it reads in the reaction force instruction torque $T_M$ corresponding to a steering operating angle $\theta_S$ of the steering wheel 2 detected by the rotary encoder 33 from a table of the reaction force instruction torque relative to a steering operating angle (S30), and the steering torque $T_S$ is detected by the torque sensor 32 (S32). Then, a torque deviation $\Delta D_n = T_M - T_S$ defined between the reaction force instruction torque $T_M$ and the steering torque $T_S$ is calculated (S34), and an integral element $D_n = \Delta D_n K_{I2}$ of reaction force control ($K_{I2}$: predetermined integral constant) is calculated (S36).

Thereafter, a proportional element $P_n = (\Delta D_n - \Delta D_{n-1}) K_{P2}$ ($D_{n-1}$: torque deviation in the preceding cycle, $K_{P2}$: predetermined proportional constant) is calculated (S38), and a target current of the electric motor in the reaction force actuator 3 (reaction force motor target current) $J_M = J_0 + D_n + P_n$ ($J_0$: target current in the preceding cycle) is calculated (S40). Thereafter, a current $J_S$ of the electric motor in the reaction force actuator 3 is detected by the current sensor 3b (S42), and a current deviation $\Delta D_n' = J_M - J_S$ defined between the target current $J_M$ and the actual current $J_S$ in the electric motor is calculated (S44).

Then, the steering control unit 4 calculates an integral element $D_n' = \Delta D_n' K_{I2}'$ ($K_{I2}'$: predetermined integral constant), and calculates a proportional element $P_n' = (\Delta D_n' - \Delta D_{n-1}') K_{P2}'$ ($D_{n-1}'$: current deviation in the preceding cycle, $K_{P2}'$: predetermined proportional constant)(S48). Then, a target voltage of the electric motor in the reaction force actuator 3 (reaction force motor target voltage) $V_M = V_0 + D_n' + P_n'$ ($V_0$: a target value of the preceding cycle) is calculated (S50) to output the target voltage $V_M$ from the driving circuit 3a, whereby the electric motor of the reaction actuator 3 is driven. Thereafter, the target current $J_M$, the target voltage $V_M$, the torque deviation $\Delta D_n$, and the current deviation $\Delta D_n'$ are defined as the target current $J_0$ in the preceding cycle, the target voltage $V_0$ in the preceding cycle, the torque deviation in the preceding cycle $\Delta D_{n-1}$, and the current deviation in the preceding cycle $\Delta D_{n-1}'$, respectively (S52), and the procedure returns.

Embodiment 2.

The construction of the vehicle steering apparatus and the operation other than the routine for detecting a driver's hands free state and that for returning control according to the present example are the same as those of Embodiment 1, so that the explanation therefor will not be repeated. The steering control unit 4 includes a driver's hands free state detecting means for detecting a driver's hands free state, a reaction force stopping means for stopping reaction force control of the steering operating means, a steering operating angle speed control means for controlling a returning angular speed in steering operating angle of the steering operating means, a steering angle control means for controlling to reduce a steering angle of the steering mechanism, a speed comparing means for comparing a moving speed with a predetermined speed, and a torque comparing means for comparing a detected steering torque with a predetermined value.

Figure 6:
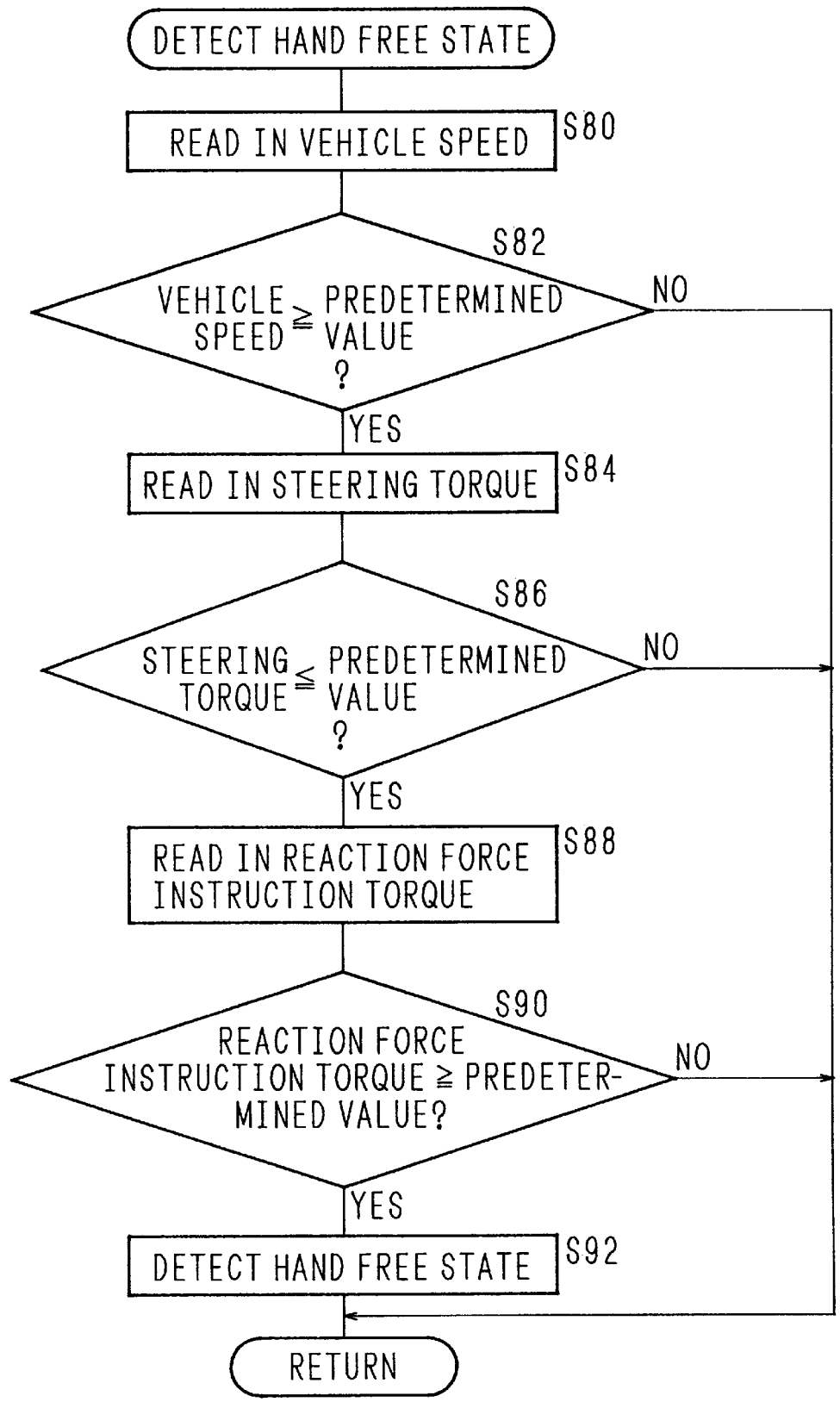
FIG. 6 is a flowchart illustrating a processing procedure of the routine for detecting a driver's free hands state in the vehicle steering apparatus according to Embodiment 2.

FIG. 6 is a flowchart illustrating in detail the routine (R2 in FIG. 2) for a processing procedure of the driver's hands free state according to Embodiment 2. The steering control unit 4 obtains a vehicle speed from the vehicle speed sensor 6 (S80), and when the vehicle speed is a predetermined value or more (S82), it reads in a steering torque of the steering wheel 2 from the torque sensor 32 (S84). Otherwise, the routine returns. When the read steering torque is a predetermined value or less (S86), the steering control unit 4 gets a reaction force instruction torque corresponding to a steering operating angle of the steering wheel 2 (S88). Otherwise, the routine returns.

When the obtained reaction force instruction torque is a predetermined value or more (S90), the steering control unit 4 judges that there is a driver's, hands free state (S92), and the procedure returns.

In the event that: (i) the read vehicle speed (S80) is the predetermined value or less (S82); or (ii) the obtained steering torque (S84) exceeds the predetermined value (S86); or (iii) the read reaction force instruction torque is less than the predetermined value (S90), the steering control unit 4 does not judge that there is a driver's hands free state, and the procedure returns.

In other words, the steering control unit 4 judges that there is a driver's hands free state in the cases when the vehicle speed is the predetermined value or more (S82), when the steering torque is the predetermined value or less (S86), and when the reaction force instruction torque is the predetermined value or more (S90) (i.e., the difference between the reaction force instruction torque and the steering torque is significant).

It is to be noted that a condition such as a difference of steering torque being a predetermined value or more (i.e., a rapid decrease in steering torque) may be added in place of the condition that the reaction force instruction torque is the predetermined value or more (S90) mentioned above.

Figure 7:
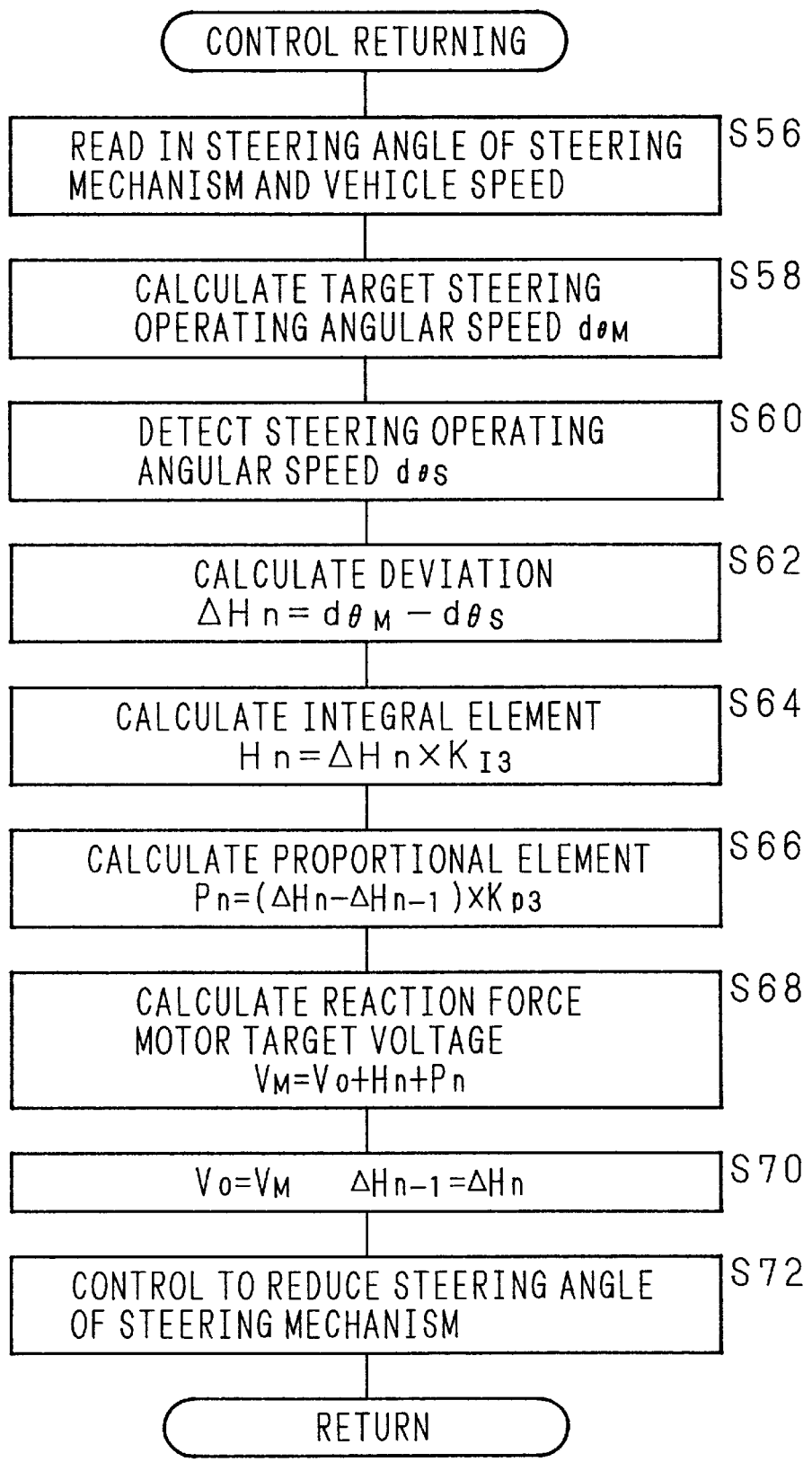
FIG. 7 is a flowchart illustrating a processing routine for return control in the vehicle steering apparatus according to Embodiment 2.

FIG. 7 is a flowchart illustrating in detail a processing procedure for the return controlling routine (R6 in FIG. 2) according to Embodiment 2. When a driver's hands free state is detected (R4 in FIG. 2), the steering control unit 4 reads in a steering angle of the wheels 10, 10 (steering mechanism) from the steering angle sensor 16 and moving speed of the vehicle from the vehicle speed sensor 6 (S56), whereby a target steering operating angular speed $d\theta_M$ of the steering wheel 2 is calculated on the basis of the read steering angle and the moving speed (S58).

Then, the steering control unit 4 detects a steering operating angular speed $d\theta_S$ of the steering wheel 2 from changes in the steering operating angle $\theta_S$ of the steering wheel 2 detected by the rotary encoder 33 (S60), and calculates a steering operating angular speed deviation $\Delta H_n = d\theta_M - d\theta_S$ defined between the target steering operating angular speed $d\theta_M$ and the actual steering operating angular speed $d\theta_S$ of the steering wheel 2 (S62). Thereafter, an integral element of returning control $H_n = \Delta H_n K_{13}$ ($K_{13}$: predetermined integral constant) is calculated (S64), and further a proportional element $P_n = (H_n - H_{n-1}) K_{P3}$ ($H_{n-1}$: steering operating angular speed deviation in the preceding cycle, $K_{P3}$: predetermined proportional constant) is calculated (S66).

Then, a target voltage of the electric motor in the reaction force actuator 3 (reaction force motor target voltage) $V_M = V_0 + H_n + P_n$ ($V_0$: target value in the preceding cycle) is calculated (S68) to output the target voltage $V_M$ from the driving circuit 3a, whereby the electric motor of the reaction force actuator 3 is driven. Thereafter, the target voltage $V_M$, and the steering operating angular speed deviation $H_n$ are transferred to the target voltage $V_0$ in the preceding cycle, and the steering operating angular speed deviation in the preceding cycle $H_{n-1}$, respectively (S70). Thereafter, the steering control unit 4 controls to reduce the steering angle of the wheels 10, 10 (steering mechanism) on the basis of the steering operating angle $\theta_S$ of the steering wheel 2 (S72) detected by the rotary encoder 33 (S60), and the procedure returns. Embodiment 3.

The construction of the vehicle steering apparatus and the routine for reaction force control according to Embodiment 3 are the same as the construction and the reaction force control routine (R8 in FIG. 2) of Embodiment 1, so that the explanation therefor will be omitted. Wherein the steering control unit 4 includes a driver's hands free state detecting means for detecting a driver's hands free state, a correcting means for correcting to reduce a reaction force to be applied to the steer operation means on the basis of a detection signal of the driver's hands free state detecting means in response to a steering angle signal of the steering angle detecting means, a speed comparing means for comparing a moving speed with a predetermined speed, a torque comparing means for comparing a detected steering torque with a predetermined value, a differential value comparing means for comparing the value obtained by differentiating the steering torque with a predetermined value.

Figure 8:
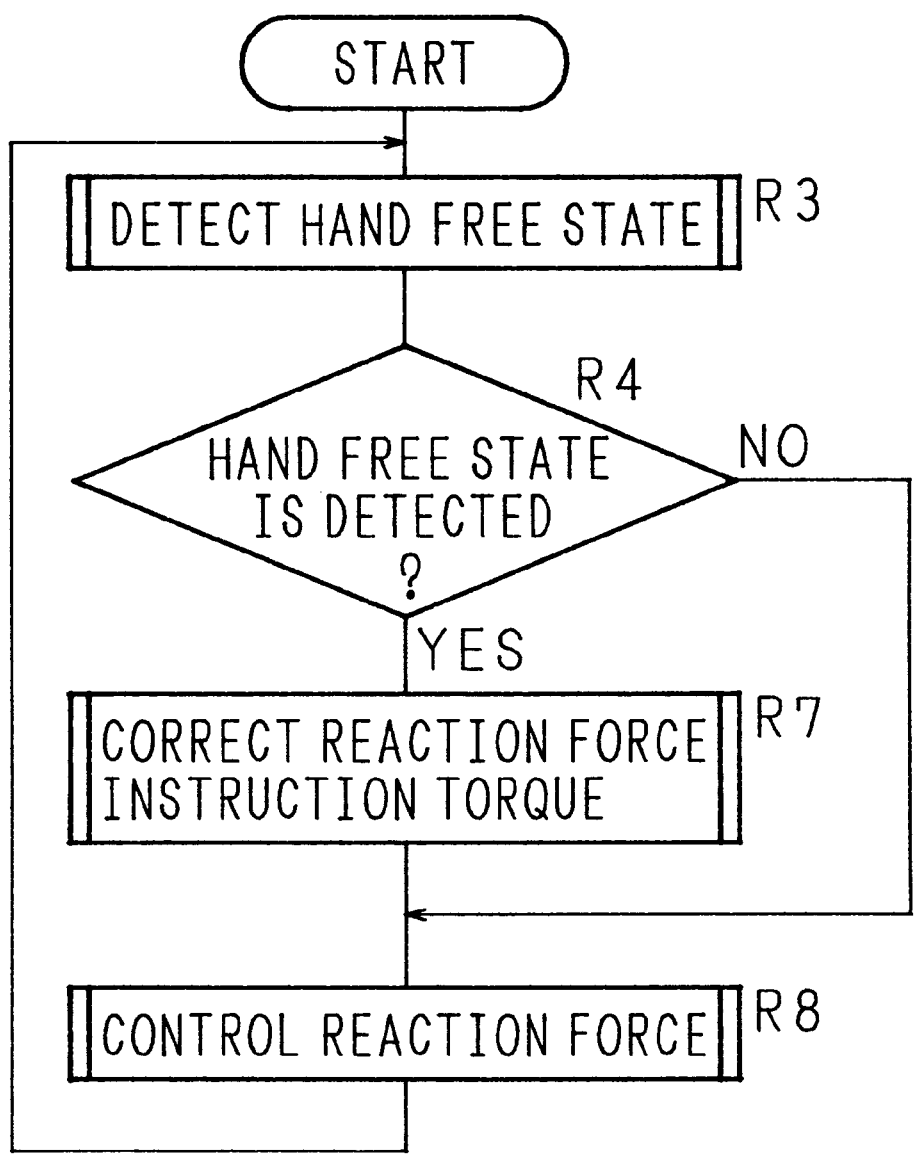
FIG. 8 is a flowchart illustrating a procedure of operation in the vehicle steering apparatus according to Embodiment 3.

FIG. 8 is a flowchart illustrating a processing procedure for operation of the vehicle steering apparatus according to Embodiment 3. The vehicle steering apparatus of the present example periodically performs a routine such that a state in which a driver releases his (or her) hold on the steering wheel 2 is detected in the case where the wheels returns to their neutral positions (straight traveling position) due to self-aligning torque during traveling of the vehicle, and as a result, the steering wheel 2 returns to its neutral position (R3). When a driver's hands free state is not detected (R4), the above-mentioned routine for reaction force control is executed (R8). When a driver's hands free state is detected (R4), after correcting an instruction torque for reaction force control (R7), the reaction force control is executed (R8).

Figure 9:
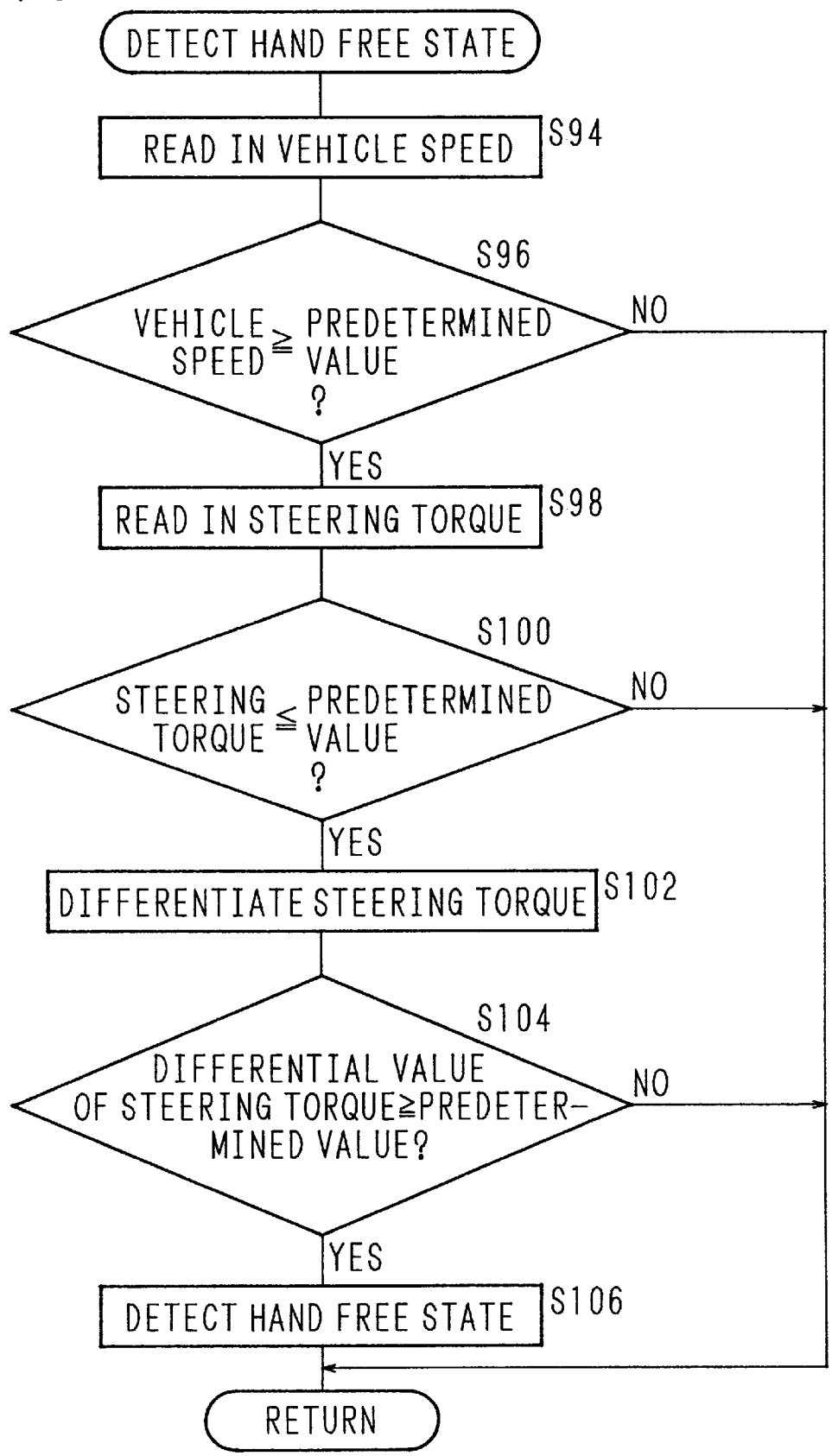
FIG. 9 is a flowchart illustrating a processing routine for detecting a driver's free hands state in the vehicle steering apparatus according to Embodiment 3.

FIG. 9 is a flowchart illustrating in detail a processing (R3 in FIG. 8) for detecting a driver's hands free state of Embodiment 3. The steering control unit 4 reads in a vehicle speed from the vehicle speed sensor 6 (S94), when the vehicle speed is a predetermined value or more (S96), the steering control unit 4 obtains the steering torque of the steering wheel 2 from the torque sensor 32 (S98). When the read steering torque is a predetermined value or less (S100), a difference between the steering torque in the preceding sampling cycle and the steering torque at this time is determined to be differentiated (S102).

When (an absolute value of) a differential value of the steering torque is a predetermined value or more (S104), the steering control unit 4 judges that there is a driver's hands free state and detects the same (S106), and the procedure returns. On the other hand, if the steering control unit 4 does not judges that there is a driver's hands free state in any one of the cases where the obtained vehicle speed (S94) is the predetermined value or less (S96), where the obtained steering torque (S98) exceeds the predetermined value (S100), and where the differential value of the steering torque (S102) is less than the predetermined value (S104), the procedure returns.

In other words, the steering control unit 4 judges that there is a driver's hands free state in case the vehicle speed is the predetermined value or more (S96), the case when the steering torque is the predetermined value or less (S100), and the case when the differential value of the steering torque is the predetermined value or more (S104) (rapid decrease in steering torque).

It is to be noted that such a condition that a reaction force instruction torque is a predetermined value or more (a deviation defined between the reaction force instruction torque and a steering torque is significant) may be added in place of the above-mentioned condition to the effect that the differential value of steering torque is the predetermined value or more (S104).

Figure 10:
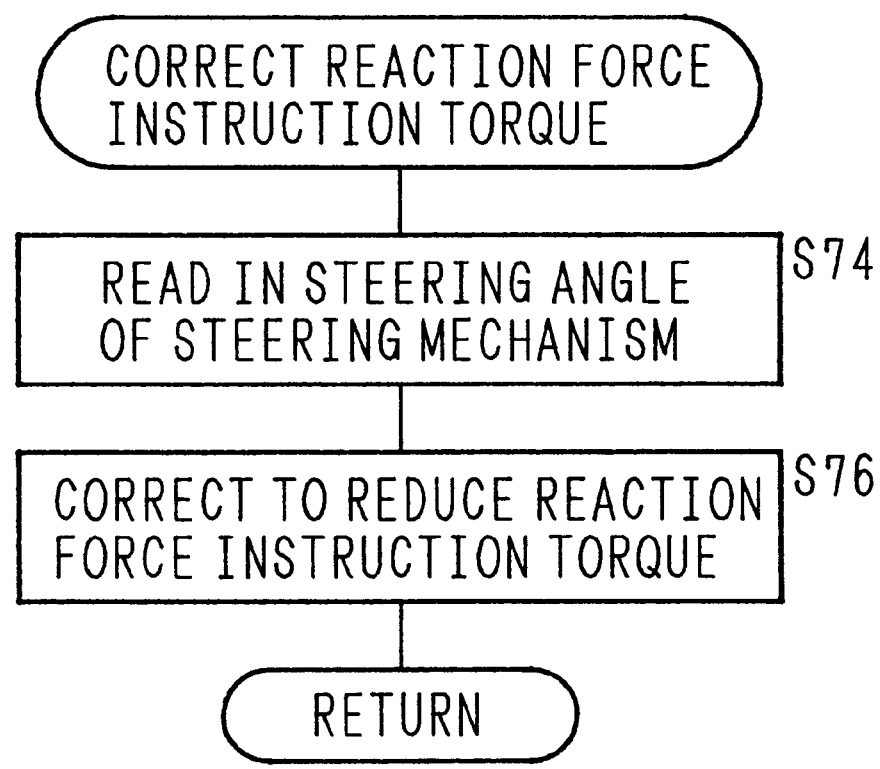
FIG. 10 is a flowchart illustrating a processing routine for correcting a reaction force for instruction torque in the vehicle steering apparatus according to Embodiment 3.

FIG. 10 is a flowchart illustrating in detail a processing procedure for correcting the instruction torque routine (R7) according to Embodiment 3. When a driver's hands free state is detected (R4 in FIG. 8), the steering control unit 4 reads in a steering angle of the wheels 10, 10 (steering mechanism) from the steering angle sensor 16 (S74), and it reduces and corrects the reaction force instruction torque on the basis of the obtained steering angle (S76). Then, the procedure returns. The steering control unit 4 executes the reaction force controlling routine (FIG. 5) based on the reaction force instruction torque reduced and corrected.

It is to be noted that the vehicle steering apparatus in the above described Embodiments is merely exemplary of the present invention, the structure of the reaction force actuator 3 and the steering motor 5 are not intended to be limited thereby. As a matter of course, other operating means than the steering wheel 2, for example, lever, joy stick and the like may be used as the steering operating means in the present invention.

According to the vehicle steering apparatus of the present invention, natural returning to the neutral position of steering wheel which follows the returning to the neutral position of wheels due to self-aligning torque can be realized.

Furthermore, a driver's hands free state can be detected precisely in the present invention, and natural return to the neutral position of the steering wheel following the returning to the neutral position of wheels due to self-aligning torque can be realized in case of a driver's hands free state.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

We claim:

1. A vehicle steering apparatus, for a vehicle having wheels, the apparatus comprising:
    a steering operating means;
    a steering mechanism not mechanically connected with said steering operating means constructed to steer the vehicle wheels on the basis of a control amount supplied from said steering operating means;
    a steering angle detector detecting a steering angle of said steering mechanism and producing a steering angle signal;
    a reaction force motor coupled to apply a reaction force to said steering operating means on the basis of the steering control amount;
    a driver's hands free state detector detecting when a driver's hands are free of the steering operating means and producing a hands free detection signal;
    a reaction inhibitor stopping reaction force control with respect to said reaction force motor on the basis of the hands free detection signal from said driver's hands free state detector; and
    a steering operating angle controller controlling a steering operating angle of said steering operating means on the basis of the steering angle signal of said steering angle detector during inhibition of reaction force control for said steering operating means.

2. The vehicle steering apparatus as claimed in claim 1, further comprising:
    a vehicle speed detector detecting a moving speed of the vehicle; and
    a steering torque detector detecting a steering torque applied to said steering operating means,
    wherein said driver's hands free state detector includes:
        a speed comparator comparing the moving speed detected by said vehicle speed detector with a predetermined speed; and
        a torque comparator comparing the steering torque detected by said steering torque detector with a predetermined value, and
    said driver's hands free state detector detects said driver's hands free state when said moving speed is greater than the predetermined speed and said steering torque is smaller than the predetermined value.

3. The vehicle steering apparatus as claimed in claim 1, further comprising:
    a vehicle speed detector detecting a moving speed of the vehicle; and
    a steering torque detector detecting a steering torque applied to said steering operating means,
    wherein said driver's hands free state detector includes:
        a speed comparator comparing the moving speed detected by said vehicle speed detector with a predetermined speed;
        a torque comparator comparing the steering torque detected by said steering torque detector with a predetermined value; and
        a reaction force comparator comparing a reaction force to be applied to said steering operating means with a predetermined value, and
    said driver's hands free state detector detects said driver's hands free state when said moving speed is higher than the predetermined speed, said steering torque is smaller than the predetermined value, and said reaction force to be applied to said steering operating means is larger than the predetermined value.

4. The vehicle steering apparatus as claimed in claim 1, further comprising:
    a vehicle speed detector detecting a moving speed of the vehicle; and
    a steering torque detector detecting a steering torque applied to said steering operating means,
    wherein said driver's hands free state detector includes:
        a speed comparator comparing the moving speed detected by said vehicle speed detector with a predetermined speed;
        a torque comparator comparing the steering torque detected by said steering torque detector with a predetermined value;
        a differentiator differentiating the steering torque detected by said steering torque detector; and
        a differential value comparator comparing the value obtained by differentiating said steering torque with a predetermined value, and
    said driver's hands free state detector detects said driver's hands free state when said moving speed is higher than the predetermined speed, said steering torque is smaller than the predetermined value, and said value obtained by differentiating said steering torque is larger than the predetermined value.

5. A vehicle steering apparatus, for a vehicle having wheels, the apparatus comprising:
    a steering operating means;
    a steering mechanism not mechanically connected with said steering operating means constructed to steer the vehicle wheels on the basis of a control amount supplied from said steering operating means;

a steering angle detector detecting a steering angle of said steering mechanism and producing a steering angle signal representative thereof;

a vehicle speed detector detecting a moving speed of the vehicle and producing a vehicle speed signal representative thereof;

a reaction force motor applying a reaction force to said steering operating means on the basis of a steering control amount of said wheels;

a driver's hands free state detector detecting when a driver's hands are free of the steering operating means and the same returns to its neutral position;

a reaction inhibitor stopping reaction force control with respect to said reaction force motor on the basis of the detection signal from said driver's hands free state detector; and a steering operating angular speed controller controlling a returning angular speed in steering operating angle of said steering operating means on the basis of the vehicle speed signal of said vehicle speed detecting means and the steering angle signal of said steering angle detector during inhibition of reaction force control for said steering operating means.

6. The vehicle steering apparatus as claimed in claim 5, further comprising a steering torque detector detecting a steering torque applied to said steering operating means, wherein said driver's hands free state detector includes:
a speed comparator comparing the moving speed detected by said vehicle speed detector with a predetermined speed; and
a torque comparator comparing the steering torque detected by said steering torque detector with a predetermined value, and said driver's hands free state detector detects said driver's hands free state when said moving speed is greater than the predetermined speed and said steering torque is smaller than the predetermined value.

7. The vehicle steering apparatus as claimed in claim 5, further comprising a steering torque detector detecting a steering torque applied to said steering operating means, wherein said driver's hands free state detector includes:
a speed comparator for comparing the moving speed detected by said vehicle speed detector with a predetermined speed;
a torque comparator comparing the steering torque detected by said steering torque detector with a predetermined value; and
a reaction force comparator comparing a reaction force to be applied to said steering operating means with a predetermined value, and said driver's hands free state detector detects said driver's hands free state when said moving speed is greater than the predetermined speed, said steering torque is smaller than the predetermined value, and said reaction force to be applied to said steering operating means is larger than the predetermined value.

8. The vehicle steering apparatus as claimed in claim 5, further comprising a steering torque detector detecting a steering torque applied to said steering operating means, wherein said driver's hands free state detector includes:
a speed comparator comparing the moving speed detected by said vehicle speed detector with a predetermined speed;
a torque comparator comparing the steering torque detected by said steering torque detector with a predetermined value;

a differentiator differentiating the steering torque detected by said steering torque detector; and
a differential value comparator comparing the value obtained by differentiating said steering torque with a predetermined value, and said driver's hands free state detector detects said driver's hands free state when said moving speed is higher than the predetermined speed, said steering torque is smaller than the predetermined value, and said value obtained by differentiating said steering torque is larger than the predetermined value.

9. The vehicle steering apparatus as claimed in claim 5, further comprising:

a steering operating angle detector detecting a steering operating angle of said steering operating means; and a steering angle controller controlling reduction of a steering angle of said steering mechanism on the basis of the steering operating angle detected by said steering operating angle detector when said driver's hands free state detector detects said driver's hands free state.

10. The vehicle steering apparatus as claimed in claim 9, further comprising a steering torque detector detecting a steering torque applied to said steering operating means, wherein said driver's hands free state detecting means includes:
a speed comparator comparing the moving speed detected by said vehicle speed detector with a predetermined speed; and
a torque comparator comparing the steering torque detected by said steering torque detector with a predetermined value, and said driver's hands free state detector detects said driver's hands free state when said moving speed is greater than the predetermined speed and said steering torque is smaller than the predetermined value.

11. The vehicle steering apparatus as claimed in claim 9, further comprising a steering torque detector detecting a steering torque applied to said steering operating means, wherein said driver's hands free state detector includes:
a speed comparator comparing the moving speed detected by said vehicle speed detector with a predetermined speed;
a torque comparator comparing the steering torque detected by said steering torque detector with a predetermined value; and
a reaction force comparator comparing a reaction force to be applied to said steering operating means with a predetermined value, and said driver's hands free state detector detects said driver's hands free state when said moving speed is greater than the predetermined speed, said steering torque is smaller than the predetermined value, and said reaction force to be applied to said steering operating means is larger than the predetermined value.

12. The vehicle steering apparatus as claimed in claim 9, further comprising a steering torque detector detecting a steering torque applied to said steering operating means, wherein said driver's hands free state detector includes:
a speed comparator comparing the moving speed detected by said vehicle speed detector with a predetermined speed;
a torque comparator comparing the steering torque detected by said steering torque detector with a predetermined value;
a differentiator differentiating the steering torque detected by said steering torque detector; and a differential value comparator comparing the value obtained by differentiating said steering torque with a predetermined value, and said driver's hands free state detector detects said driver's hands free state when said moving speed is greater than the predetermined speed, said steering torque is smaller than the predetermined value, and said value obtained by differentiating said steering torque is larger than the predetermined value.

13. A vehicle steering apparatus for a vehicle having wheels, the apparatus, comprising:

a steering operating means;

a steering mechanism not mechanically connected with said steering operating means constructed to steer the vehicle wheels on the basis of a control amount supplied from said steering operating means;

a steering angle detector detecting a steering angle of said steering mechanism and producing a steering angle signal;

a reaction force motor coupled to apply a reaction force to said steering operating means on the basis of the steering control amount;

a driver's hands free state detector detecting when a driver's hands are free of the steering operating means and producing a hands free detection signal and producing a detection signal; and a corrector correcting reaction force to be applied to said steering operating means on the basis of the detection signal of said driver's hands free state detector in response to the steering angle signal of said steering angle detecting means.

14. The vehicle steering apparatus as claimed in claim 13, further comprising:

a vehicle speed detector detecting a moving speed of the vehicle; and a steering torque detector detecting a steering torque applied to said steering operating means, wherein said driver's hands free state detector includes:
a speed comparator comparing the moving speed detected by said vehicle speed detector with a predetermined speed; and
a torque comparator comparing the steering torque detected by said steering torque detector with a predetermined value, and said driver's hands free state detector detects said driver's hands free state when said moving speed is greater than the predetermined speed and said steering torque is smaller than the predetermined value.

15. The vehicle steering apparatus as claimed in claim 13, further comprising:

a vehicle speed detector for detecting a moving speed of the vehicle; and a steering torque detector detecting a steering torque applied to said steering operating means, wherein said driver's hands free state detector includes:
a speed comparator comparing the moving speed detected by said vehicle speed detector with a predetermined speed;
a torque comparator comparing the steering torque detected by said steering torque detector with a predetermined value; and
a reaction force comparator comparing a reaction force to be applied to said steering operating means with a predetermined value, and said driver's hands free state detector detects said driver's hands free state when said moving speed is greater than the predetermined speed, said steering torque is smaller than the predetermined value, and said reaction force to be applied to said steering operating means is larger than the predetermined value.

16. The vehicle steering apparatus as claimed in claim 13, further comprising:

a vehicle speed detector detecting a moving speed of the vehicle; and a steering torque detector detecting a steering torque applied to said steering operating means, wherein said driver's hands free state detector includes:
a speed comparator comparing the moving speed detected by said vehicle speed detector with a predetermined speed;
a torque comparator comparing the steering torque detected by said steering torque detector with a predetermined value;
a differentiator differentiating the steering torque detected by said steering torque detector; and
a differential value comparator comparing the value obtained by differentiating said steering torque with a predetermined value, and said driver's hands free state detector detects said driver's hands free state when said moving speed is greater than the predetermined speed, said steering torque is smaller than the predetermined value, and said value obtained by differentiating said steering torque is larger than the predetermined value.

* * * * *